US008873651B2

(12) United States Patent
Muhammad et al.

(10) Patent No.: US 8,873,651 B2
(45) Date of Patent: Oct. 28, 2014

(54) OFDM GENERATION APPARATUS IN A MULTI-CARRIER DATA TRANSMISSION SYSTEM

(75) Inventors: Nabil Muhammad, Stuttgart (DE); Lothar Stadelmeier, Stuttgart (DE); Joerg Robert, Vreden (DE)

(73) Assignee: Sony Corporation, Tokyo (JP)

(*) Notice: Subject to any disclaimer, the term of this patent is extended or adjusted under 35 U.S.C. 154(b) by 697 days.

(21) Appl. No.: 13/005,046

(22) Filed: Jan. 12, 2011

(65) Prior Publication Data

US 2011/0182380 A1    Jul. 28, 2011

(30) Foreign Application Priority Data

Jan. 22, 2010   (EP) ..................... 10151486

(51) Int. Cl.
*H04L 27/28* (2006.01)
*H04L 27/26* (2006.01)
*H04L 27/38* (2006.01)
*H04L 27/36* (2006.01)

(52) U.S. Cl.
CPC ............ *H04L 27/367* (2013.01); *H04L 27/265* (2013.01); *H04L 27/3872* (2013.01); *H04L 27/2628* (2013.01)
USPC ........... 375/260; 375/267; 375/295; 375/343; 375/346; 375/348; 375/143; 375/144; 375/146; 375/148; 375/150; 375/152; 375/316; 370/203; 370/208; 370/210; 455/63.1; 455/114.2; 455/296

(58) Field of Classification Search
USPC .......... 375/259–260, 267, 295, 298; 370/203, 370/208, 210
See application file for complete search history.

(56) References Cited

U.S. PATENT DOCUMENTS

| 2009/0325516 A1* | 12/2009 | Safavi ......................... 455/126 |
| 2010/0166088 A1* | 7/2010 | Arambepola et al. ........ 375/260 |
| 2010/0195668 A1 | 8/2010 | Robert et al. |
| 2012/0287771 A1* | 11/2012 | Loghin et al. ................. 370/210 |

OTHER PUBLICATIONS

"Digital Video Broadcasting (DVB); Frame Structure Channel Coding and Modulation for a Second Generation Digital Transmission System for Cable Systems (DVB-C2)", DVB Document A138, Apr. 2009, 109 pages.*
ReDesign, "Deliverable D11—Transmission ShorUist Document," URL: http://www.ict-redesign.euIfileadminIdocumentsIReDesign-D1 I_Coax_transmission-shortlist_document.pdf, Total 62 pages, (Jul. 14, 2009), XP-002628165.*

(Continued)

*Primary Examiner* — Daniel Washburn
*Assistant Examiner* — Eboni Hughes
(74) *Attorney, Agent, or Firm* — Oblon, Spivak, McClelland, Maier & Neustadt, L.L.P.

(57) ABSTRACT

An OFDM generation apparatus and methods for generating OFDM transmission signals from OFDM symbols, each including a plurality of OFDM subcarriers, for transmission in a multi-carrier data transmission system, is provided. The provided apparatus and method may use a selected mixing frequency for mixing complex time-domain samples of OFDM symbols from a baseband frequency up to a passband frequency to obtain OFDM transmission signals, wherein the mixing frequency is selected such that common phase rotations of the OFDM subcarriers of OFDM symbols with respect to adjacent OFDM symbols of the OFDM transmission signals are avoided or compensated after the mixing. Additional apparatuses and methods for avoidance or compensation of such common phase rotations are also provided.

23 Claims, 5 Drawing Sheets

(56) References Cited

OTHER PUBLICATIONS

U.S. Appl. No. 13/486,473, filed Jun. 1, 2012, Stadelmeier, et al.
"Digital Video Broadcasting (DVB): Frame Structure Channel Coding and Modulation for a Second Generation Digital Terrestrial Television Broadcasting System (DVB-T2)", ETSI EN 302 755 V1.1.1, European Standard (Telecommunications Series), Sep. 2009, 167 pages.
U.S. Appl. No. 13/325,973, filed Dec. 14, 2011, Stadelmeier, et al.
"Digital Video broadcasting (DVB); Implementation Gyidelines for a second generation digital cable transmission system (DVB-C2)", DVB Document A147, Mar. 2013, pp. 79-86.

* cited by examiner

OFDM GENERATION APPARATUS IN A MULTI-CARRIER DATA TRANSMISSION SYSTEM

FIELD OF INVENTION

The present invention relates to an OFDM generation apparatus and method for generating OFDM transmission signals from OFDM symbols, each comprising a plurality of OFDM subcarriers, for transmission in a multi-carrier data transmission system.

The present invention relates further to a transmission apparatus and method, a corresponding receiving apparatus and method, a data transmission system and a computer readable non-transitory medium storing computer program for implementing the OFDM generation methods on a computer.

The present invention relates particularly to the field of broadcasting, in particular of Digital Video Broadcasting (DVB), especially to devices, systems and methods in accordance with the DVB-C2 standard or the upcoming DVB-NGH standard.

BACKGROUND OF THE INVENTION

Broadcast systems in accordance with the DVB-C2 standard as described in the DVB-C2 specification (DVB Blue-Book A138 "Digital Video Broadcasting (DVB); Frame structure channel coding and modulation for a second generation digital transmission system for cable systems (DVB-C2)") apply the concept of Absolute OFDM, in which all OFDM subcarriers are seen relative to the absolute frequency 0 MHz instead of a signal center frequency. Reason for the application of Absolute OFDM and unique pilot pattern across the medium spectrum in DVB-C2 is to avoid repeating OFDM subcarrier allocations in the frequency domain that result in an increased PAPR (Peak to Average Power Ratio). The Absolute OFDM signal is described in the final RF frequency domain. This means, however, that a baseband signal cannot be shifted to any RF carrier frequency (also called "mixing frequency" hereinafter) without the introduction of common phase rotations between OFDM symbols after the step of mixing during the OFDM generation by use of the RF carrier frequency.

SUMMARY OF INVENTION

It is an object of the present invention to provide an OFDM generation apparatus and method dealing with the problem of common phase rotations of the OFDM subcarriers of successive OFDM symbols, in particular by which such common phase rotations are avoided or compensated.

It is a further object of the present invention to provide a corresponding transmission apparatus and method, a corresponding receiving apparatus and method, a data transmission system and a computer readable non-transitory medium storing a corresponding computer program.

According to an aspect of the present invention there is provided an OFDM generation apparatus for generating OFDM transmission signals from OFDM symbols, each comprising a plurality of OFDM subcarriers, for transmission in a multi-carrier data transmission system, said apparatus comprising an inverse DFT means configured to inverse discrete Fourier transform an OFDM symbol into complex time-domain samples, and a frequency mixing means configured to mix said complex time-domain samples of said OFDM symbol from a baseband frequency up to a passband frequency by use of a mixing frequency to obtain said OFDM transmission signal, wherein the mixing frequency is selected such that common phase rotations of the OFDM subcarriers of said OFDM symbol with respect to adjacent OFDM symbols of said OFDM transmission signal are avoided or compensated after said mixing.

According to another aspect of the present invention there is provided an OFDM generation apparatus for generating OFDM transmission signals from OFDM symbols, each comprising a plurality of OFDM subcarriers, for transmission in a multi-carrier data transmission system, said apparatus comprising an inverse DFT means configured to inverse discrete Fourier transform an OFDM symbol into complex time-domain samples, wherein the OFDM symbols are mapped onto frames of a frame structure having a channel bandwidth, said frames having a payload portion being segmented in frequency domain into data segments each covering a band-width portion of said channel bandwidth, and wherein data symbols are mapped onto said data segments, a frequency mixing means configured to mix said complex time-domain samples of said OFDM symbol from a baseband frequency up to a passband frequency by use of a transmitter mixing frequency to obtain said OFDM transmission signal, and a receiver mixing frequency determination means configured to determine receiver mixing frequencies for mixing a received OFDM transmission signal from a passband frequency down to a baseband frequency by use of a receiver mixing frequency to obtain complex time-domain samples of a data symbol in a receiver, wherein the receiver mixing frequencies are selected such that common phase rotations of the OFDM subcarriers of a data symbol with respect to adjacent data symbols of the same data segment are avoided or compensated after mixing a received OFDM transmission signal from a passband frequency down to a baseband frequency by use of said receiver mixing frequency.

According to still another aspect of the present invention there is provided an OFDM generation apparatus for generating OFDM transmission signals from OFDM symbols, each comprising a plurality of OFDM subcarriers, for transmission in a multi-carrier data transmission system, said apparatus comprising a multiplication unit configured to multiply the OFDM symbols with a multiplication factor for compensating common phase rotations of the OFDM subcarriers of said OFDM symbol, which could be introduced by mixing said complex time-domain samples of said OFDM symbol from a baseband frequency up to a passband frequency by use of a mixing frequency, an inverse DFT means configured to inverse discrete Fourier transform an OFDM symbol into complex time-domain samples, and a frequency mixing means configured to mix said complex time-domain samples of said OFDM symbol from a baseband frequency up to a passband frequency by use of said mixing frequency to obtain said OFDM transmission signal.

According to still another aspect of the present invention there is provided an OFDM decoding apparatus for decoding OFDM transmission signals into OFDM symbols, each comprising a plurality of OFDM subcarriers, received in a multi-carrier data transmission system, said apparatus comprising a frequency mixing means configured to mix said OFDM transmission signal from a passband frequency down to a baseband frequency by use of a mixing frequency to obtain complex time-domain samples of an OFDM symbol, and a DFT means configured to discrete Fourier transform said complex time-domain samples into a data symbol, wherein the mixing frequency is selected such that common phase rotations of the OFDM subcarriers of said OFDM symbol are avoided or compensated.

According to still another aspect of the present invention there is provided an OFDM decoding apparatus for decoding OFDM transmission signals into data symbols, each comprising a plurality of OFDM subcarriers, received in a multi-carrier data transmission system, said apparatus comprising a frequency mixing means configured to mix said OFDM transmission signal from a passband frequency down to a baseband frequency by use of a mixing frequency to obtain complex time-domain samples of a data symbol, wherein the OFDM symbols are mapped onto frames of a frame structure having a channel bandwidth, said frames having a payload portion being segmented into data segments each covering a bandwidth portion of said channel bandwidth, and wherein said OFDM symbols are subdivided into data symbols mapped onto said data segments, and a DFT means configured to discrete Fourier transform said complex time-domain samples into a data symbol, wherein the mixing frequency is selected such that common phase rotations of the OFDM subcarriers of said data symbol are avoided or compensated.

According to further aspects of the present invention there are provided corresponding OFDM generation methods and OFDM decoding methods, a transmission apparatus and method, a receiving apparatus and method, a data transmission system as well as a computer readable non-transitory medium having instructions stored thereon which, when carried out on a computer, cause the computer to perform the steps of said OFDM generation methods or said OFDM decoding methods as defined above.

Preferred embodiments of the invention are defined in the dependent claims. It shall be understood that the claimed devices, methods, system and computer program have similar and/or identical preferred embodiments as defined in the dependent claims defining preferred embodiment of the OFDM generation apparatus.

The present invention is based on the common inventive idea that undesired common phase rotations of the OFDM subcarriers of an OFDM symbol or a data symbol (in case of using a segmented OFDM as, for instance, according to the DVB-C2 standard) are avoided or compensated by taking appropriate measures related to the carrier frequency by which the complex time-domain samples are mixed. This is of partiuclar importance for systems according to the DVB-C2 standard that apply Absolute OFDM, since the generated OFDM signal is described in the passband and does not contain any phase rotations between adjacent OFDM symbol. It should be understood that generating an OFDM signal in the passband is very complex and costly. Therefore it is beneficial to generate the signal in the equivalent baseband and to mix it with a suitable mixing frequency into the passband. However, normally this mixing process results in the described phase rotations between OFDM symbols.

To overcome this problem, according to the present invention the carrier frequency is selected such that such common phase rotations are completely avoided or compensated. According to another solution, based on the same idea, the OFDM symbols are multiplied with a multiplication factor, which artificially introduces common phase rotations between OFDM symbols in the baseband signal, which, however, balance the phase rotations caused by the mixing of the complex time-domain samples of the OFDM symbol from a baseband frequency up to a passband frequency by use of a mixing frequency, so that finally no common phase rotations appear in the passband signal (i.e. the Absolute OFDM signal contains no phase rotations between OFDM symbols). Hence, according to the present invention it can be achieved, that signals can be generated that are in conformity with the related standards, if there is any standard to be observed.

It shall be noted that herein the terms "carrier" and "subcarrier" are used interchangeably and shall carry the same meaning.

BRIEF DESCRIPTION OF DRAWINGS

These and other aspects of the present invention will be apparent from and explained in more detail below with reference to the embodiments described hereinafter. In the following drawings

DESCRIPTION OF PREFERRED EMBODIMENTS

Figure 1:
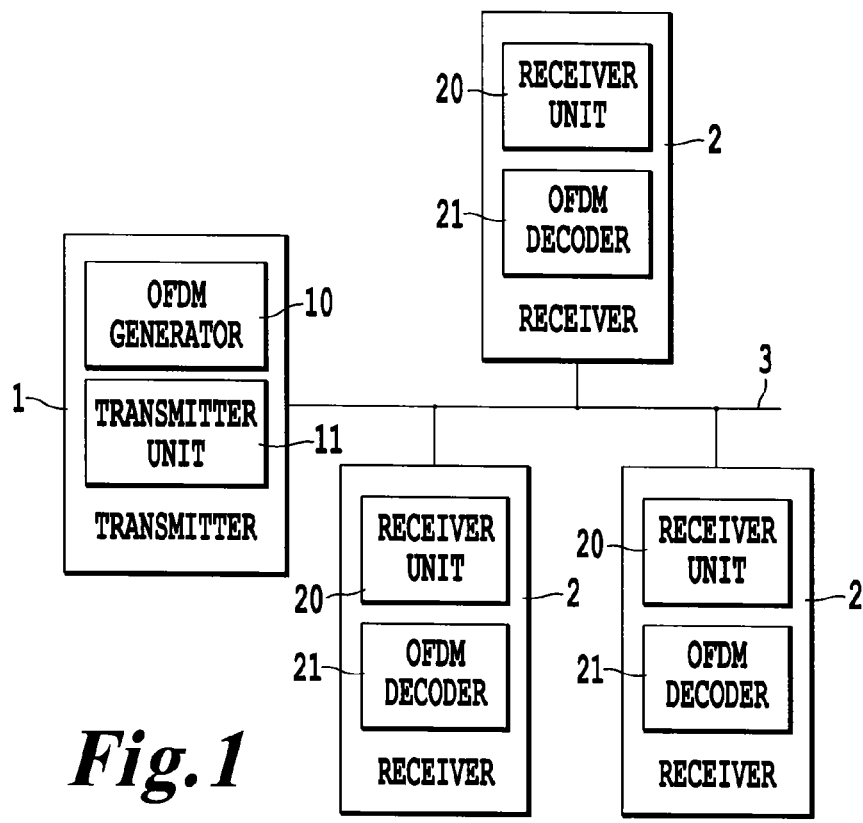
FIG. 1 shows a block diagram of a data transmission system according to the present invention.

The DVB-C2 specification introduces the new concept of Absolute OFDM, in which all OFDM subcarriers are seen relative to the absolute frequency 0 MHz instead of a signal centre frequency. In particular, the L1 part 2 signalling blocks begin at the absolute frequency of 0 MHz and are partitioned in steps of 7.61 MHz. In contrast to other DVB standards it is not possible to shift a C2 baseband signal to any RF mixing frequency rather than being defined in a unique way for the whole cable spectrum. Especially the pilot sequences of the OFDM signal are different for all different frequencies. The reason for that behavior is to avoid unwanted repetitions in the frequency domain which may cause unwanted high peak values of the OFDM signal in time domain. Furthermore the unambiguous pilot sequences allow for easy and reliable synchronization and offset compensation. Although the L1 part 2 block partitioning and the related pilot sequences are defined for the whole cable spectrum, L1 blocks are only transmitted in those frequencies where data slices are present.

The formulas given in section 10.1 of DVB-C2 specification defining the passband signal emitted from the OFDM generator are of the precise theoretical mathematical description, but are impractical for real implementations. Real implementations for OFDM signal generation are normally based on the inverse Fast Fourier Transform and the equivalent lowpass representation of signals. However, the generation of a standard compliant DVB-C2 signal using the equivalent lowpass representation requires additional considerations. Otherwise, unwanted phase jumps may be generated between adjacent OFDM symbols that could disturb the synchronisation procedure within the receiver. Practical implementations based on the inverse Fast Fourier Transform and the equivalent lowpass representation are therefore proposed according to the present invention.

Due to the application of Absolute OFDM the direct signal generation within the passband is complex or even impractical. Therefore, OFDM generation using the equivalent lowpass representation is proposed. The signal is generated at low frequencies and shifted to the final frequency afterwards.

According to the DVB-C2 specification the emitted passband signal is described by the following expression:

$$s(t) = \text{Re}\left\{\sum_{m=0}^{\infty}\left[\frac{1}{\sqrt{K_{total}}}\sum_{l=0}^{L_F-1}\sum_{k=K_{min}}^{K_{max}} c_{m,l,k} \times \psi_{m,l,k}(t)\right]\right\}$$

where $$\psi_{m,l,k}(t) = \begin{cases} e^{j2\pi\frac{k}{T_U}(t-\Delta-lT_S-mT_F)} & mT_F + lT_S \leq t < mT_F + (l+1)T_S \\ 0 & \text{otherwise} \end{cases}$$

and
k denotes the carrier number;
l denotes the OFDM Symbol number starting from 0 for the first Preamble Symbol of the frame;
m denotes the C2 Frame number;
$K_{total}$ is the number of transmitted carriers, i.e. $K_{total}=K_{max}-K_{min}+1$;
$L_F$ total number of OFDM Symbols per frame (including the preamble);
$T_S$ is the total symbol duration for all symbols, and $T_S=T_U+\Delta$;
$T_U$ is the active symbol duration;
$\Delta$ is the duration of the guard interval;
$c_{m,l,k}$ is the complex modulation value for carrier k of the OFDM Symbol number l in C2 Frame number m;
$T_F$ is the duration of a frame, $T_F=L_FT_S$;
$K_{min}$ Carrier index of first (lowest frequency) active carrier; and
$K_{max}$ Carrier index of last (highest frequency) active carrier.

In order to generate this signal within using the equivalent lowpass representation, a carrier to shift the frequencies is added, which is compensated within the equation of Ψ:

$$s(t) = \frac{1}{\sqrt{K_{total}}} \cdot \text{Re}\left\{e^{j2\pi f_c t} \cdot \sum_{m=0}^{\infty}\sum_{l=0}^{L_F-1}\sum_{k=K_{min}}^{K_{max}} c_{m,l,k} \cdot \Psi'_{m,l,k}(t)\right\} \quad (1)$$

with $$\psi'_{m,l,k}(t) = \quad (2)$$

$$\begin{cases} e^{j2\pi\frac{k}{T_U}(t-\Delta-lT_S-mT_F)} \cdot e^{-j2\pi f_c t} & mT_F + lT_S \leq t < mT_F + (l+1)T_S \\ 0 & \text{otherwise} \end{cases}$$

Equation (2) cannot be directly transformed into the equation known from section 9.5 of the DVB-T2 specification (ETSI EN 302 755 V1.1.1 (2009-09) "Digital Video Broadcasting (DVB): Frame structure channel coding and modulation for a second generation digital terrestrial television broadcasting system (DVB-T2)") defining the signal emitted by the OFDM generator as used in a transmitter according to the DVB-T2 standard. The reason is the second exponential term. While the equations defined in section 9.5 of the DVB-T2 specification are independent from the actual mixing frequency $f_c$, this initially will lead to phase jumps between OFDM symbols of the DVB-C2 signal. However, this effect can be avoided by means of a well-chosen mixing frequency $f_c$. Therefore, the mixing frequency shall be defined as:

$$f_c = \frac{k_c}{T_U}$$

where $1/T_U$ is the OFDM subcarrier spacing, and $k_c$ is the OFDM subcarrier index at the mixing frequency. Furthermore, k shall be substituted by $k=k'+k_c$. This leads to:

$$\psi'_{m,l,k}(t) = \quad (3)$$

$$\begin{cases} e^{j2\pi\frac{k'+k_c}{T_U}(t-\Delta-lT_S-mT_F)} \cdot e^{-j2\pi\frac{k_c}{T_U}t} & mT_F + lT_S \leq t < mT_F + (l+1)T_S \\ 0 & \text{otherwise,} \end{cases}$$

which can be reformulated as:

$$\psi'_{m,l,k}(t) = \quad (4)$$

$$\begin{cases} e^{j2\pi\frac{k'}{T_U}(t-\Delta-lT_S-mT_F)} \cdot e^{-j2\pi\frac{k_c}{T_U}\Delta(1+l+mL_F)} & mT_F + lT_S \leq t < mT_F + (l+1)T_S \\ 0 & \text{otherwise.} \end{cases}$$

Equation (4) looks similar to the signal definition of the DVB-T2 signal as described in section 9.5 of the DVB-T2 specification. However, both equations differ in the last exponential term. This term is independent of the time t and causes a constant phase rotation for all OFDM subcarriers of a given OFDM symbol. Generally, it is possible to choose $k_c$ freely (and thus $f_c$) and to compensate this phase rotation. However, this term can be avoided by choosing $k_c$ properly. For this purpose, equation (4) can be written as:

$$\psi'_{m,l,k}(t) = \quad (5)$$

$$\begin{cases} e^{j2\pi\frac{k'}{T_U}(t-\Delta-lT_S-mT_F)} \cdot e^{-j2\pi\frac{k_c}{T_U} \cdot T_U\left(\frac{\Delta}{T_U}\right)(1+l+mL_F)} & mT_F + lT_S \leq t < mT_F + (l+1)T_S \\ 0 & \text{otherwise,} \end{cases}$$

where $(\Delta/T_U)$ is the relative Guard Interval duration (e.g. 1/64 or 1/128 for DVB-C2). Additional simplification of (5) leads to:

$$\psi'_{m,l,k}(t) = \quad (6)$$

$$\begin{cases} e^{j2\pi\frac{k'}{T_U}(t-\Delta-lT_S-mT_F)} \cdot e^{j\varphi_{k_c}(1+l+mL_F)} & mT_F + lT_S \leq t < mT_F + (l+1)T_S \\ 0 & \text{otherwise.} \end{cases}$$

Hence, this leads to a common phase rotation of $$\varphi_{k_c} = -2\pi \cdot k_c \left(\frac{\Delta}{T_U}\right) \quad (7)$$

for all OFDM subcarriers between two consecutive OFDM symbols, which depends on the choice of the relative Guard Interval duration ($\Delta/T_U$) (e.g. 1/64 or 1/128 for DVB-C2) and the OFDM subcarrier $k_c$ at the mixing frequency.

If $k_c (\Delta/T_U)$ is integer, the phase shift can be removed from the equation as it becomes multiples of $2\pi$. Hence, if $k_c$ is multiple of 128 for Guard Interval 1/128, or multiple of 64 for Guard Interval 1/64, equation (6) can be written as:

$$\psi'_{m,l,k}(t) = \begin{cases} e^{j2\pi \frac{k'}{T_U}(t-\Delta-lT_S-mT_F)} & mT_F + lT_S \le t < mT_F + (l+1)T_S \\ 0 & \text{otherwise,} \end{cases} \quad (8)$$

which is similar to the equation for the generation of a DVB-T2 signal. However, it has to be noted that the mixing frequency $f_c$ is consequently not the centre frequency of the signal in most cases.

As described above, a common phase rotation may be artificially introduced to the system, depending on the mixing frequency. This common phase rotation is compensated according to an embodiment of the present invention in order to obtain an output signal as defined in the DVB-C2 specification. Alternatively, according to another embodiment this common phase rotation can be avoided by carefully choosing the mixing frequency $f_c$. Therefore, the OFDM subcarrier $k_c$ at the mixing frequency $f_c$ shall be chosen as:

$$k_c = \left\lfloor \frac{K_{max} + K_{min}}{2} \cdot \frac{\Delta}{T_U} + \frac{1}{2} \right\rfloor \cdot \frac{1}{\left(\frac{\Delta}{T_U}\right)}, \quad (9)$$

where ($\Delta/T_U$) is the relative Guard Interval duration (i.e. 1/64 or 1/128 in DVB-C2). Practically, equation (9) obtains the carrier $k_c$ that is closest to the central OFDM subcarrier $(K_{max}+K_{min})/2$, and additionally, generates multiples of $2\pi$ in the above equation (7). Here, the operation $\lfloor x \rfloor$ denotes the floor operation (largest integer not greater than x). More generally, the mixing frequency $f_c$ is selected as $$f_c = \frac{k_c}{T_U}$$

with the OFDM subcarrier $k_c$ at the mixing frequency $f_c$ being selected to be close or as close as possible to the central subcarrier among the subcarriers of said OFDM symbol. Here, "close" shall be understood such that not necessarily the mixing frequency $f_c$ must be located as close as possible to the central subcarrier, but can also be located farther away. For instance, one of the next possible mixing frequencies (seen from the frequency of the central subcarrier) that fulfills the above mentioned condition that $k_c (\Delta/T_U)$ is integer can be selected as well.

Consequently, the obtained mixing frequency $f_c$ is:

$$f_c = \frac{k_c}{T_U}, \quad (10)$$

where $1/T_U$ is the OFDM subcarrier spacing. Here, the resulting mixing frequency $f_c$ is not the centre frequency of the OFDM signal in most cases.

In a more general embodiment the mixing frequency $f_c$ is selected as $$f_c = \frac{k_c}{T_U}$$

with the OFDM subcarrier $k_c$ at the mixing frequency $f_c$ being selected to be as close as possible to the central subcarrier among the subcarriers of said OFDM symbol, wherein $T_U$ is the useful OFDM symbol duration. In other words, the mixing frequency $f_c$ is selected such that the OFDM subcarrier $k_c$ at the mixing frequency $f_c$ is selected that is nearest to $$k_c = \frac{K_{max} + K_{min}}{2}.$$

In the following it is assumed that the mixing frequency $f_c$ is chosen as described above in equations (9) and (10). Hence, the transmitted signal can be described as:

$$s(t) = \frac{1}{\sqrt{K_{total}}} \cdot \text{Re}\left\{ e^{j2\pi f_c t} \cdot \sum_{m=0}^{\infty} \sum_{l=0}^{L_F-1} \sum_{k=K_{min}}^{K_{max}} (c_{m,l,k} \cdot e^{j\varphi_{m,l}}) \cdot \Psi''_{m,l,k}(t) \right\} \quad (11)$$

with $$\Psi''_{m,l,k}(t) = \begin{cases} e^{j2\pi \frac{k'}{T_U}(t-\Delta-lT_S-mT_F)} & mT_F + lT_S \le t < mT_F + (l+1)T_S \\ 0 & \text{otherwise,} \end{cases} \quad (12)$$

and $$\varphi_{m,l} = -\varphi_{k_c} \cdot (1 + l + m \cdot L_F) \quad (12a)$$

where $k_c$ denotes the OFDM subcarrier at the mixing frequency $f_c$;
$k'$ denotes the carrier number relative to the OFDM subcarrier at the mixing frequency $f_c$, i.e. $k'=k-k_c$;
$\phi_{k_c}$ denotes the phase jump between two consecutive OFDM symbols as calculated according to equation (7); and
where the other parameters have the above mentioned meaning.

Practically, this generation is equivalent to the generation of a DVB-T2 signal as shown above. The only difference is the additional phase correction term $\phi_{m,l}$ that linearly increases every OFDM symbol and compensates the unwanted phase rotations in the generated output signal. The data $c'_k$ that is used for calculating the inverse FFT is the inner bracket of equation (11), i.e. $(c_{m,l,k} \cdot e^{j\varphi_{m,l}})$.

An embodiment of a possible implementation of a transmitter will now be described. First, in FIG. 1 a multi-carrier data transmission system, here a broadcast system, according to the present invention is shown, in particular according to the DVB-C2 standard. The multi-carrier broadcast system comprises a transmitter 1 for transmitting data and one or more receivers 2 for receiving data from said transmitter 1.

The transmitter 1 is provided for processing input data, e.g. one or more MPEG-2 Transport Streams and/or one or more Generic Streams, to obtain OFDM transmission signals, which are fed into a cable network 3, to which said receivers 2 are connected. For this purpose the transmitter comprises particularly an OFDM generator 10 for generating said OFDM transmission signals from OFDM symbols obtained as input data or generated from the input data of the transmitter 1 (for which purpose the transmitter 1 may additionally comprise further elements, e.g. as described in the DVB-C2 standard). Further, the transmitter 1 comprises a transmitter unit 11 for feeding the obtained OFDM transmission signals into the cable network 3.

The receivers 2 each comprise a receiver unit 20 for receiving said OFDM transmission signals from the cable network 3 and an OFDM decoder 21 for decoding OFDM transmission signals into OFDM symbols, which are then outputted for further processing or which are directly further processed in the receiver 2 (for which purpose the receiver 2 may additionally comprise further elements, e.g. as described in the DVB-C2 standard).

Figure 2:
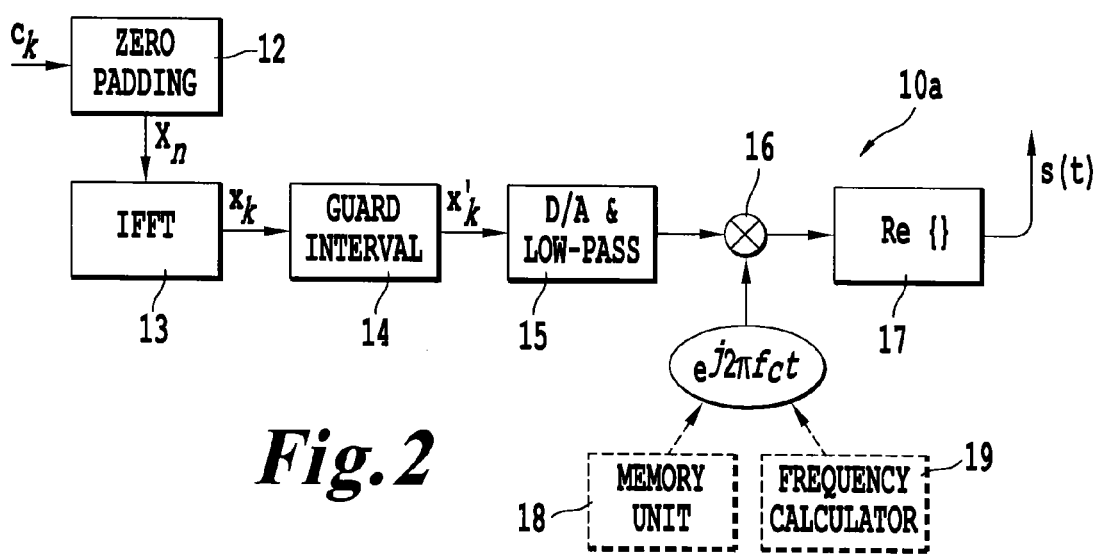
FIG. 2 shows a block diagram of a first embodiment of an OFDM generator according to the present invention.

FIG. 2 depicts a schematic block diagram of an embodiment of an OFDM generator 10a for the generation of the OFDM signal s(t), which will be described in detail in the following. Briefly summarized, the input signal to the OFDM generator is first zero padded for preparation of the inverse Fast Fourier Transform (IFFT). Then, the Guard Interval is added, the signal is converted from digital to analog, and finally, shifted to the wanted passband frequency.

The zero padding in a zero padding unit 12 is preferably provided to pre-condition the signal for the transformation of the frequency domain signal into the time domain using the Inverse Fast Fourier Transform. Firstly, the signal is stuffed in order to fit the IFFT size N. Secondly, a realignment of the subcarrier positions is done to be able to use the IFFT.

In order to use the Inverse Fast Fourier Transform, e.g. based on the Radix 2 algorithm, it has to hold $N=2^p$, $p=1, 2, 3, 4, \ldots$ Generally, instead of using a Fast Fourier Transform it is also possible to use a Discrete Fourier Transform (DFT). Furthermore, the value N shall be significantly higher than the actual number of used OFDM subcarriers in order to avoid alias effects, i.e.

$$K_{total}=K_{max}-K_{min}+1 \leq N=K_{total}+x, \quad (13)$$

where x shall preferably be at least 512 for practical implementations according to DVB-C2, but could also be lower, e.g. 64 for WLAN applications.

Figure 3:
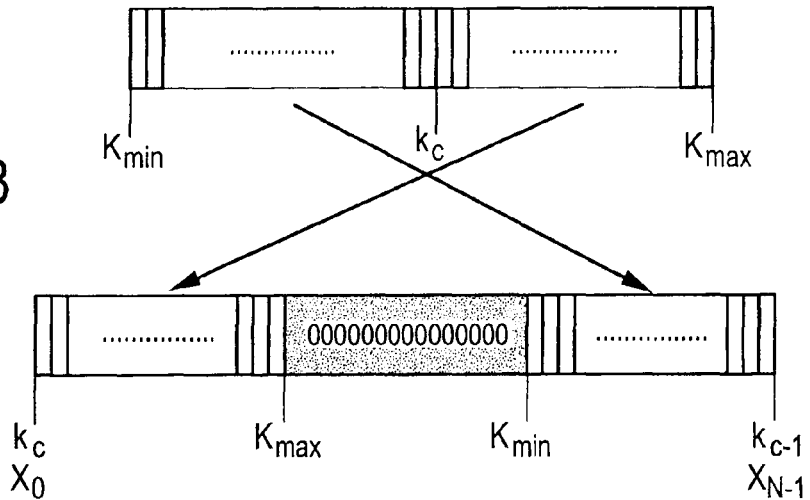
FIG. 3 shows a diagram illustrating zero padding.

FIG. 3 depicts the principle of the zero padding. In principle, it realises a cyclic shift operation on the actually used OFDM subcarriers and inserts zeros to the remaining positions. Mathematically this operation can be described as:

$$X(n)_{m,l} = \begin{cases} c_{m,l,k_c+n} & 0 \leq n \leq K_{max} - k_c \\ 0 & \text{otherwise} \\ c_{m,l,k_c+(n-N)} & N-(k_c-K_{min}) \leq n < N \end{cases} \quad \text{for } 0 \leq n < N, \quad (14)$$

where $X(n)_{m,l}$ (or $X_n$ in short) is the N element input signal of the subsequent IFFT unit 13.

The output signal $X_n$ of the zero padding unit 12 has been generated within the frequency domain. The task of the IFFT unit 13 is the calculation of the corresponding time signal. This is achieved by means of $$x(n')_{m,l} = \frac{1}{\sqrt{K_{total}}} \sum_{n=0}^{N-1} X(n)_{m,l} \cdot e^{j2\pi \frac{n' \cdot n}{N}} \quad (15)$$

for $0 \leq n' < N$, where m is the OFDM symbol, l the C2 frame number, and $K_{total}$ the total number of active OFDM subcarriers.

Figure 4:
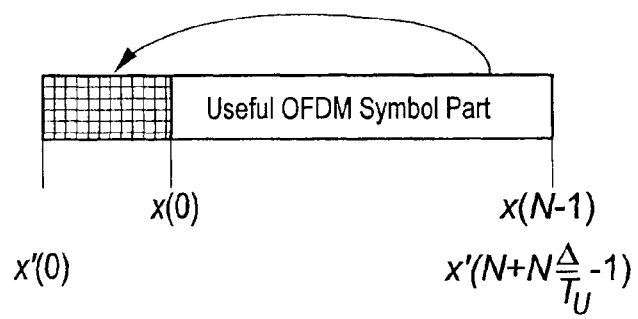
FIG. 4 shows a diagram illustrating the generation of guard intervals.

The time domain signal $x_k$ (which is the short hand notation for $x(n')_{m,l}$ in (15) if n' is substituted by k) outputted from the IFFT unit 13 is provided to a guard interval insertion unit 14. FIG. 4 depicts the insertion of the guard interval between the OFDM symbols. The guard interval is a cyclic copy of the last part of the useful OFDM symbol part, which is copied to the beginning. Mathematically, the OFDM symbol including the guard interval x'(n) (called $x'_k$ in FIG. 4) is obtained as $$x'(n)_{m,l} = \begin{cases} x\left(n+N-N \cdot \frac{\Delta}{T_U}\right) & 0 \leq n < N \cdot \frac{\Delta}{T_U} \\ x\left(n-N \cdot \frac{\Delta}{T_U}\right) & N \cdot \frac{\Delta}{T_U} \leq n < N + N \cdot \frac{\Delta}{T_U}. \end{cases} \quad (16)$$

Figure 5:
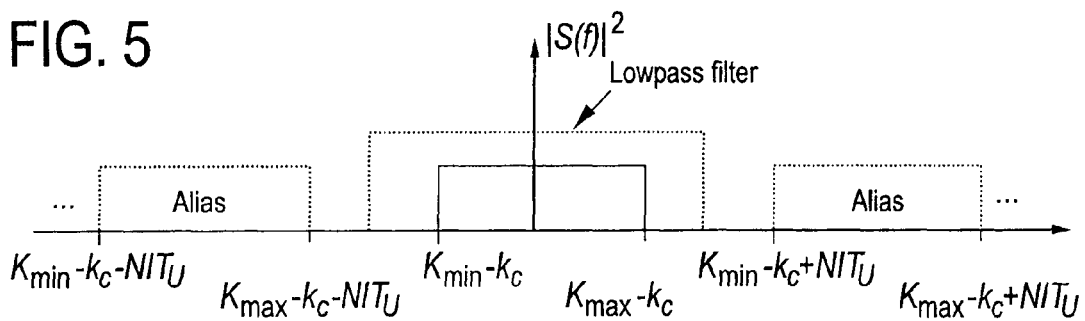
FIG. 5 shows a diagram illustrating the digital signal and its aliases.

The previous calculations have been made in the digital domain. The task of the D/A & low-pass filtering unit 15 is the conversion into an analogue signal. Therefore, the signal $x'(n)_{m,l}$ sampled with the sampling rate $N/T_U$ has to be analogized OFDM symbol by OFDM symbol. This causes alias at multiples of the sampling rate as depicted in FIG. 5 that is removed by means of the low-pass filter included in unit 15. This filtering is simpler for higher distances between the wanted and the alias signals, which is the reason why small values of x for the zero padding (see equation (13)) are impractical.

Finally, the equivalent lowpass signal outputted from unit 15 is shifted into the wanted passband by a mixer 16. The mixer 16 mixes the signal output of unit 15 with the mixing frequency $f_c$, which is equivalent to a complex multiplication of the signal by $e^{j2\pi f_c t}$. The mixing frequency $f_c$ is for this purpose calculated as described above to avoid or at least compensate any common phase rotations of the OFDM subcarriers of the OFDM symbol. From the result, the real part is determined in real part selection unit 17, which is then finally outputted from the OFDM generator 10a for transmission.

The correct mixing frequency may optionally be predetermined and stored in a storage means 18, e.g. a memory unit. In addition or as an alternative, a frequency calculation means 19 may be provided for calculating the mixing frequency.

Figure 6:
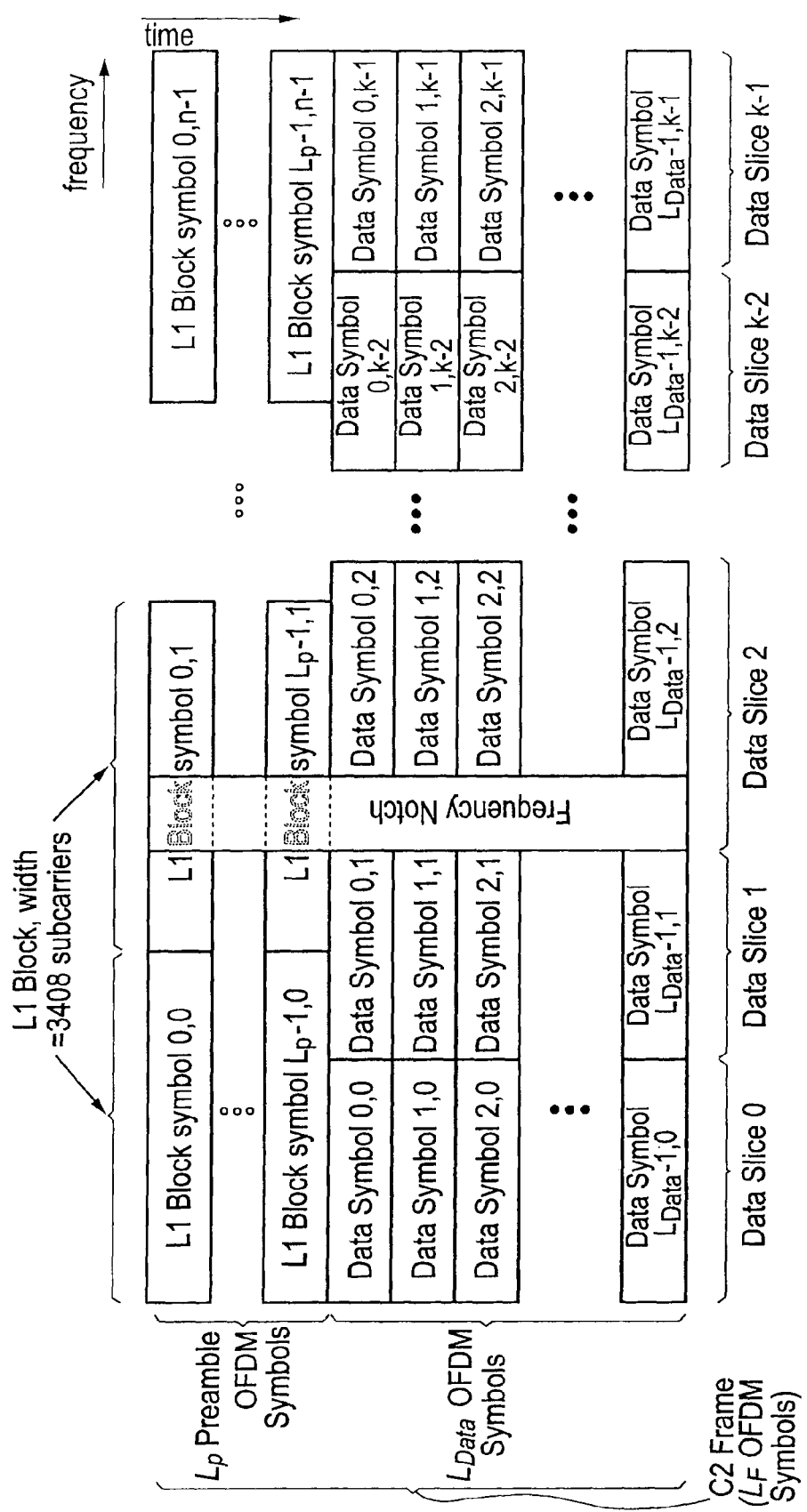
FIG. 6 illustrates the segmented frame structure as used according to DVB-C2.

The same principle explained above can also be applied in systems using a segmented frame structure, as is the case in the DVB-C2 system. Said frame structure (called "C2 frame structure") is depicted in FIG. 6. The C2 frame structure comprises $L_P$ Preamble Symbols ($L_P \geq 1$) followed by $L_{data}$ data symbols (the portion of the C2 frame comprising the $L_{data}$ data symbols also being called "payload portion"). The preamble symbols are divided in frequency direction into L1 block symbols of same bandwidth (3408 subcarriers or approx. 7.61 MHz). The data slices (also called "data segments") have an arbitrary bandwidth as a multiple of the pilot pattern specific granularity but shall not exceed the L1 block symbol bandwidth. Frequency notches can be inserted into the C2 signal across a C2 frame.

Data slices can be treated as separate channels and no interleaving is performed between different ones. Each data slice is identified by a start OFDM carrier $K_{DS,\,min}$ and an end OFDM carrier $K_{DS,\,max}$. Hence, $K_{DS,\,min}$ is the carrier index of first active carrier of the data segment, onto which the data symbol mixed with said mixing frequency is mapped, having the lowest frequency and $K_{DS,\,max}$ is the carrier index of the last active carrier of the data segment, onto which the data symbol mixed with said mixing frequency is mapped, having the highest frequency.

On the transmitter side the IFFT and the mixing on the OFDM symbols is done as usual by use of a transmitter mixing frequency, which can be selected freely or in accordance with the above described embodiment. In addition, however, receiver mixing frequencies are determined and signaled to the receiver from the transmitter (in addition to the transmitter mixing frequency) for use by the receiver, in particular an OFDM decoding apparatus. These receiver mixing frequencies are determined for each data segment or group of data segments. In other words, if the channel having a certain channel bandwidth is subdivided into multiple data segments covering a bandwidth portion of said channel bandwidth, these data segments are dealt with independently by the OFDM decoder in the receiver, and for each data segment (or group of data segments) an individual receiver mixing frequency is determined.

Figure 7:
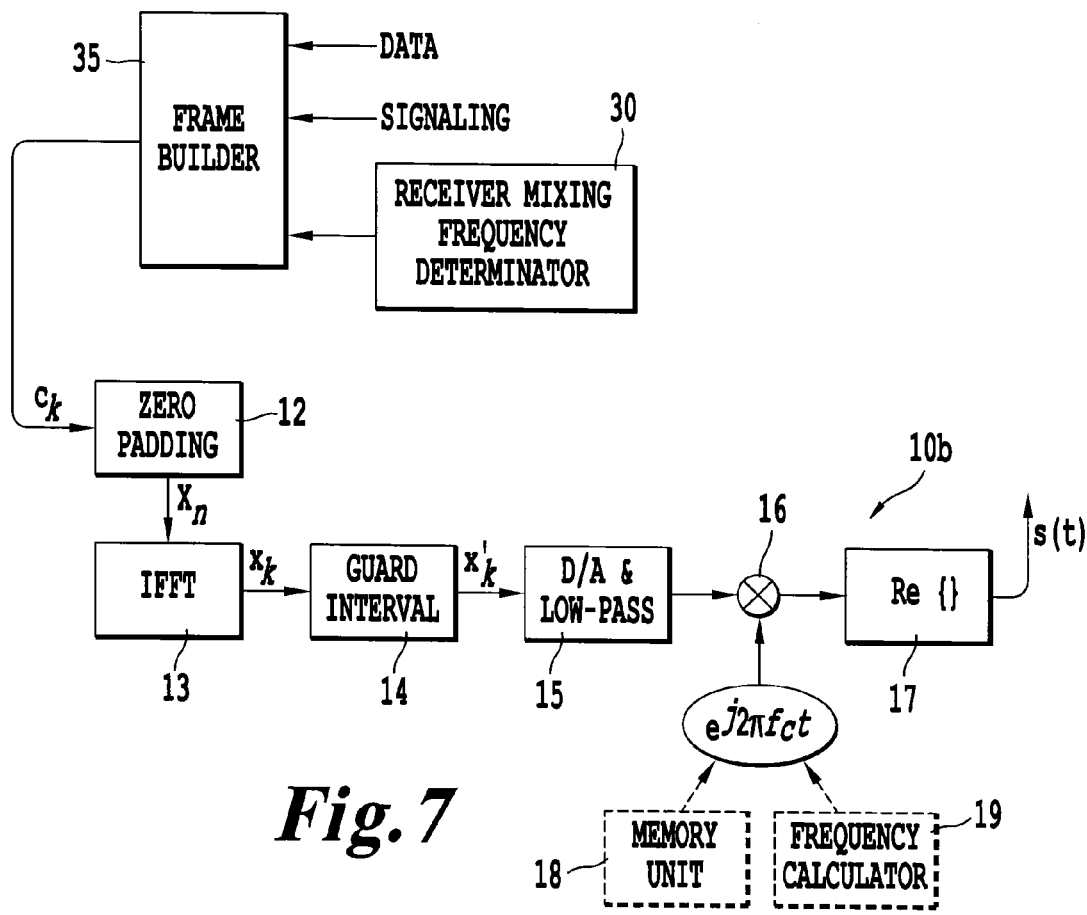
FIG. 7 shows a block diagram of a second embodiment of an OFDM generator according to the present invention.

Thus, in an embodiment 10b as depicted in FIG. 7 a receiver mixing frequency determination means 30 is provided for determining receiver mixing frequencies for mixing a received OFDM transmission signal from a passband frequency down to a baseband frequency by use of a receiver mixing frequency $f_{DS,c}$ to obtain complex time-domain samples of a data symbol in the receiver. Therein, the receiver mixing frequencies $f_{DS,c}$ are selected such that common phase rotations of the OFDM subcarriers of a data symbol with respect to adjacent data symbols of the same data segment are avoided or compensated after mixing a received OFDM transmission signal from a passband frequency down to a baseband frequency by use of said receiver mixing frequency $f_{DS,c}$.

Said receiver mixing frequencies $f_{DS,c}$ are thus determined for the individual data segments (or, alternatively, if a data symbols extends over multiple data segments for said group of multiple data segments) since the receiver, in particular the OFDM decoder of the receiver also handles the data segments (or groups of data segments) individually in systems using such a segmented frame structure.

In particular, in an embodiment the receiver mixing frequency $f_{DS,c}$ of a data segment (data slice) DS is selected as $$f_{DS,c} = \frac{k_{DS,c}}{T_U}$$

with the OFDM subcarrier $k_{DS,c}$ at the mixing frequency $f_{DS,c}$ fulfilling the condition that $$k_{DS,c} \cdot \left(\frac{\Delta}{T_U}\right)$$

is an integer, wherein $T_U$ is the useful OFDM symbol duration and $\Delta$ is the duration of the guard interval. Further, in another embodiment, the mixing frequency $f_{DS,c}$ of a data segment (data slice) DS is selected as $$f_{DS,c} = \frac{k_{DS,c}}{T_U}$$

with the OFDM subcarrier $k_{DS,c}$ at the mixing frequency $f_{DS,c}$ being selected as $$k_{DS,c} = \left\lfloor \frac{K_{DS,max} + K_{DS,min}}{2} \cdot \frac{\Delta}{T_U} + \frac{1}{2} \right\rfloor \cdot \frac{1}{\left(\frac{\Delta}{T_U}\right)}.$$

More generally, a receiver mixing frequency $f_{DS,c}$ is selected as $$f_{DS,c} = \frac{k_{DS,c}}{T_U}$$

with the OFDM subcarrier $k_{DS,c}$ at the receiver mixing frequency $f_{DS,c}$ being selected to be close or as close as possible to the central subcarrier among the subcarriers of said data symbol.

As shown in FIG. 7, the receiver mixing frequencies $f_{DS,c}$ are provided to a (generally known) frame builder 35, which is not part of the OFDM generator. Said frame builder 35 builds the frames according to the predetermined framing structure from received data, signaling information and said receiver mixing frequencies $f_{DS,c}$, which are thus signaled to the receiver for use there in the OFDM decoding as will be explained below.

Figure 8:
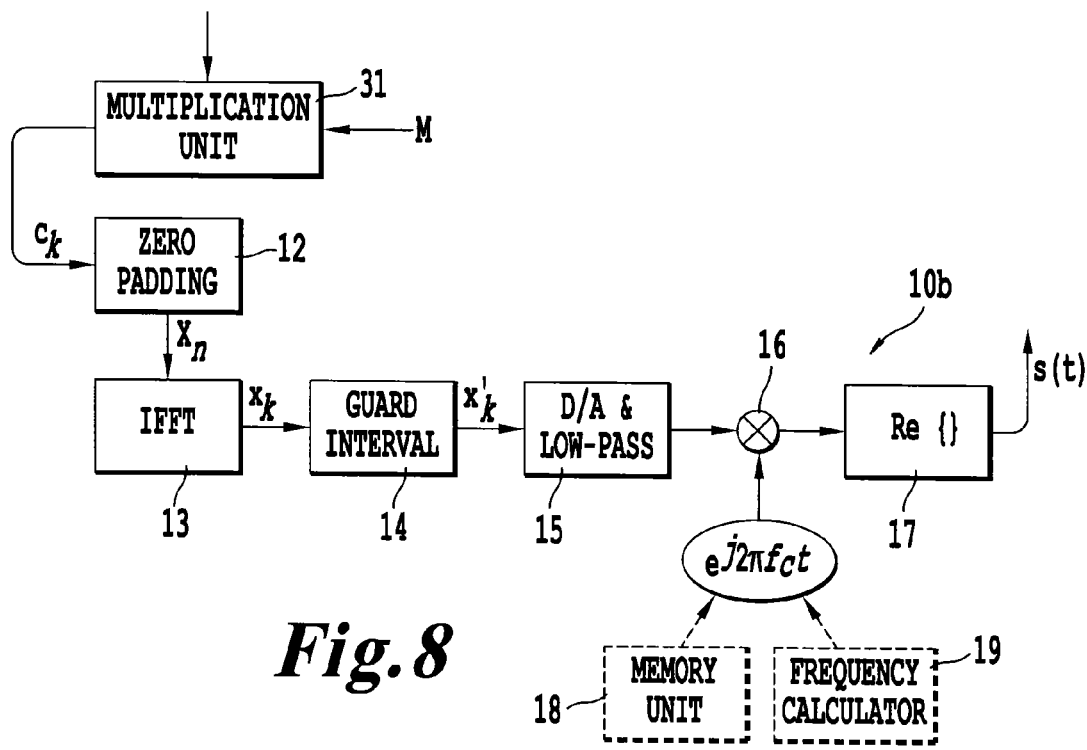
FIG. 8 shows a block diagram of a third embodiment of an OFDM generator according to the present invention.

Another embodiment 10c of an OFDM generator is depicted in FIG. 8. In addition to the general units 12 to 17 provided in the embodiment depicted in FIG. 2, a multiplication unit 31 is provided in this embodiment for multiplying the baseband OFDM symbols with a multiplication factor M for compensating common phase rotations of the OFDM subcarriers of said OFDM symbol, which could be introduced by mixing said complex time-domain samples of said OFDM symbol from a baseband frequency up to a passband frequency by use of the mixing frequency. Hence, said multiplication factor M anticipates possible common phase rotations and represents a measure for counteracting against them in the transmitter. The described operation shall be seen as a phase predistortion of the baseband signal to allow a passband signal without phase rotations between successive OFDM symbols.

Thus, it can be calculated in advance that a common phase rotation of $$\varphi_{k_c} = -2\pi \cdot k_c \left(\frac{\Delta}{T_U}\right)$$

is generated, which can be compensated by, on purpose, introducing an "opposite" common phase rotation by said multiplication factor, which can then be selected in an embodiment as $M = e^{j\varphi_{m,l}}$ wherein $\varphi_{m,l}$ is defined as above in equation (12a).

Figure 9:
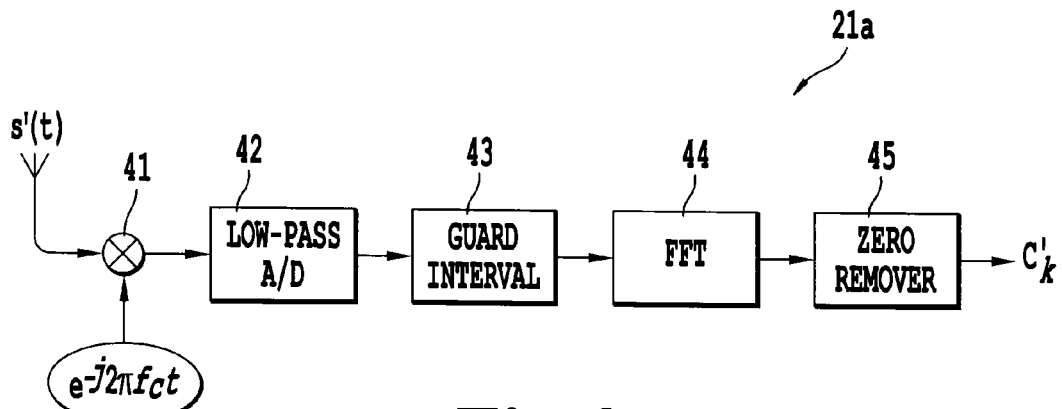
FIG. 9 shows a block diagram of a first embodiment of an OFDM decoder according to the present invention.

A block diagram of an embodiment of an OFDM decoder 21a is depicted in FIG. 9. It receives a received OFDM signal s'(t) which is subsequently provided to similar units as provided in the OFDM generator 10, in particular a mixer 41, a low-pass filter and analogue-to-digital converter 42, a guard interval remover 43, an FFT unit 44 and a zero remover 45.

The general layout of these units as generally provided in an OFDM decoder is known so that details thereof are not described here.

The mixer 41 is adapted means for mixing the receive OFDM transmission signal (s'(t)) from a passband frequency down to a baseband frequency by use of a mixing frequency $f_c$ to obtain complex time-domain samples of an OFDM symbol. The mixing frequency $f_c$, which has also been used by the OFDM generator and which has preferably been signaled from the transmitter to the receiver, is selected such that common phase rotations of the OFDM subcarriers of said OFDM symbol with respect to adjacent OFDM symbols of said OFDM transmission signal s'(t) are avoided or compensated.

Figure 10:
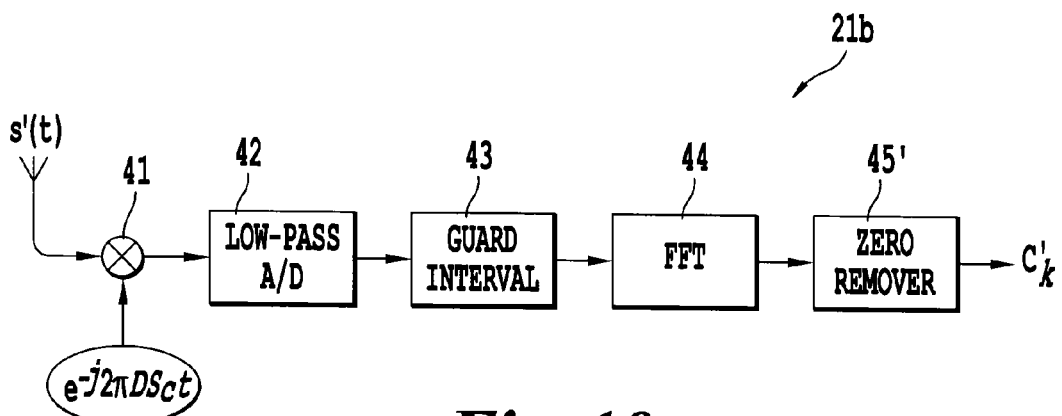
FIG. 10 shows a block diagram of a second embodiment of an OFDM decoder according to the present invention.

In another embodiment of an OFDM decoder 21b, as schematically depicted in FIG. 10, which is particularly applied when a segmented frame structure is used, the mixer 41 is adapted for mixing said received OFDM transmission signal s'(t) from a passband frequency down to a baseband frequency by use of a receiver mixing frequency $f_{DS,c}$, which has been explained above with reference to FIG. 7 to obtain complex time-domain samples of a data symbol, i.e. the data segments of the segmented frame are individually (or in groups) mixed with an individual receiver mixing frequency $f_{DS,c}$. In particular, the receiver mixing frequency $f_{DS,c}$ is selected such that common phase rotations of the OFDM subcarriers of a data symbol with respect to adjacent data symbols of the same data segment are avoided or compensated after mixing the received OFDM transmission signal s'(t) from a passband frequency down to a baseband frequency by use of said receiver mixing frequency $f_{DS,c}$. In this embodiment the zero remover 45' might have to be adopted to the need to remove zeros in the data symbols.

According to another embodiment the tuning positions of the data segments relative to the mixing frequency can be selected appropriately such that no unwanted phase rotations between the OFDM symbols appear in the receiver. Further, this alleviates time interpolation over multiple OFDM symbols that are of special importance in mobile OFDM systems such as an upcoming DVB-NGH (Next Generation Handheld) Standard.

Further, in an embodiment, applying a similar idea the lower and upper border frequencies of a data segment can be chosen appropriately such that, when the receiver tunes on the center frequency between said upper and lower boundary frequencies, no common phase rotations are generated.

The present invention is generally applicable to any data transmission systems that are faced with the above described problem of the generation of unwanted common phase rotations during the step of mixing on the transmitter side. This problem may particularly appear in any system using the concept of Absolute OFDM, as is applied in DVB-C2 broadcast systems. Hence, in all data transmission systems making use of the concept of Absolute OFDM the invention could be applied, preferably in broadcast systems.

The invention has been illustrated and described in detail in the drawings and foregoing description, but such illustration and description are to be considered illustrative or exemplary and not restrictive. The invention is not limited to the disclosed embodiments. Other variations to the disclosed embodiments can be understood and effected by those skilled in the art in practicing the claimed invention, from a study of the drawings, the disclosure, and the appended claims.

In the claims, the word "comprising" does not exclude other elements or steps, and the indefinite article "a" or "an" does not exclude a plurality. A single element or other unit may fulfill the functions of several items recited in the claims. The mere fact that certain measures are recited in mutually different dependent claims does not indicate that a combination of these measures cannot be used to advantage.

A computer program may be stored/distributed on a suitable medium, such as an optical storage medium or a solid-state medium supplied together with or as part of other hardware, but may also be distributed in other forms, such as via the Internet or other wired or wireless telecommunication systems.

Any reference signs in the claims should not be construed as limiting the scope.

The invention claimed is:

1. An Orthogonal Frequency-Division Multiplexing (OFDM) generation apparatus for generating Absolute OFDM transmission signals from OFDM symbols, each comprising a plurality of OFDM subcarriers, for transmission in a multi-carrier data transmission system, said apparatus comprising:

circuitry configured to:

determine receiver mixing frequencies for use by an OFDM decoding apparatus of a receiving apparatus for mixing a received OFDM transmission signal from a passband frequency down to a baseband frequency by use of a receiver mixing frequency $f_{DS,c}$ to obtain complex time-domain samples of a data symbol in a receiver, wherein the receiver mixing frequencies are selected such that common phase rotations of the OFDM subcarriers of the data symbol with respect to adjacent data symbols of the same data segment are avoided or compensated after mixing the received OFDM transmission signal from the passband frequency down to the baseband frequency by use of the selected receiver mixing frequencies;

inverse Discrete Fourier Transform (DFT) OFDM symbols into complex time-domain samples; and perform frequency mixing of said complex time-domain samples of said OFDM symbols from a baseband frequency up to a passband frequency by use of a mixing frequency $f_c$ to obtain said Absolute OFDM transmission signals, wherein the mixing frequency $f_c$ is selected such that common phase rotations of the OFDM subcarriers of said OFDM symbols with respect to adjacent OFDM symbols of said Absolute OFDM transmission signals are avoided or compensated after said mixing, and wherein the mixing frequency $f_c$ is selected as $$f_c = \frac{k_c}{T_U}$$

with the OFDM subcarrier $k_c$ at the mixing frequency $f_c$ being selected as $$k_c = \left\lfloor \frac{K_{max} + K_{min}}{2} \cdot \frac{\Delta}{T_U} + \frac{1}{2} \right\rfloor \cdot \frac{1}{\left(\frac{\Delta}{T_U}\right)},$$

where $T_U$ is the useful OFDM symbol duration, $\Delta$ is the duration of the guard interval, $K_{min}$ is the carrier index of first active carrier having the lowest frequency, and $K_{max}$ is the carrier index of last active carrier having the highest frequency.

2. The OFDM generation apparatus as claimed in claim 1, wherein the OFDM subcarrier $k_c$ at the mixing frequency $f_c$ fulfills the condition that $$k_c \cdot \left(\frac{\Delta}{T_U}\right)$$

is an integer.

3. The OFDM generation apparatus as claimed in claim 1, wherein the OFDM subcarrier $k_c$ at the mixing frequency $f_c$ is selected to be close or as close as possible to the central subcarrier among the subcarriers of said OFDM symbol.

4. An Orthogonal Frequency-Division Multiplexing (OFDM) generation apparatus for generating Absolute OFDM transmission signals from OFDM symbols, each comprising a plurality of OFDM subcarriers, for transmission in a multi-carrier data transmission system, said apparatus comprising:
circuitry configured to:
determine receiver mixing frequencies for use by an OFDM decoding apparatus of a receiving apparatus for mixing a received OFDM transmission signal from a passband frequency down to a baseband frequency by use of a receiver mixing frequency $f_{DS,c}$ to obtain complex time-domain samples of a data symbol in a receiver, wherein the receiver mixing frequencies are selected such that common phase rotations of the OFDM subcarriers of the data symbol with respect to adjacent data symbols of the same data segment are avoided or compensated after mixing the received OFDM transmission signal from the passband frequency down to the baseband frequency by use of the selected receiver mixing frequencies, and
wherein the receiver mixing frequency $f_{DS,c}$ is selected as $$f_{DS,c} = \frac{k_{DS,c}}{T_U}$$

with the OFDM subcarrier $k_{DS,c}$ at the receiver mixing frequency $f_{DS,c}$ being selected as $$k_{DS,c} = \left\lfloor \frac{K_{DS,max} + K_{DS,min}}{2} \cdot \frac{\Delta}{T_U} + \frac{1}{2} \right\rfloor \cdot \frac{1}{\left(\frac{\Delta}{T_U}\right)},$$

where $T_U$ is the useful OFDM symbol duration, $\Delta$ is the duration of the guard interval, $K_{DS,min}$ is the carrier index of first active carrier of the data segment, onto which the data symbol mixed with said mixing frequency is mapped, having the lowest frequency, and $K_{DS,max}$ is the carrier index of last active carrier of the data segment, onto which the data symbol mixed with said mixing frequency is mapped, having the highest frequency;
inverse Discrete Fourier Transform (DFT) OFDM symbols into complex time-domain samples, wherein the OFDM symbols include data, signaling information, and said receiver mixing frequencies, and are mapped onto frames of a frame structure having a channel bandwidth, said frames having a payload portion being segmented in frequency domain into data segments each covering a bandwidth portion of said channel bandwidth, and wherein data symbols are mapped onto said data segments; and
perform frequency mixing of said complex time-domain samples of said OFDM symbols from a baseband frequency up to a passband frequency by use of a transmitter mixing frequency to obtain said Absolute OFDM transmission signals.

5. The OFDM generation apparatus as claimed in claim 4, wherein the OFDM subcarrier $k_{DS,c}$ at the receiver mixing frequency $f_{DS,c}$ fulfilling the condition that $$k_{DS,c} \cdot \left(\frac{\Delta}{T_U}\right)$$

is an integer.

6. The OFDM generation apparatus as claimed in claim 4, wherein the OFDM subcarrier $k_{DS,c}$ at the receiver mixing frequency $f_{DS,c}$ is selected to be close or as close as possible to the central subcarrier among the subcarriers of said data symbol.

7. An Orthogonal Frequency-Division Multiplexing (OFDM) generation apparatus for generating Absolute OFDM transmission signals from OFDM symbols, each comprising a plurality of OFDM subcarriers, for transmission in a multi-carrier data transmission system, said apparatus comprising:
circuitry configured to:
multiply the OFDM symbols with a multiplication factor for compensating common phase rotations of the OFDM subcarriers of said OFDM symbols, which could be introduced by mixing complex time-domain samples of said OFDM symbols from a baseband frequency up to a passband frequency by use of a mixing frequency $f_c$;
inverse Discrete Fourier Transform (DFT) the OFDM symbols into said complex time-domain samples; and
perform frequency mixing of said complex time-domain samples of said OFDM symbols from the baseband frequency up to the passband frequency by use of said mixing frequency $f_c$ to obtain said Absolute OFDM transmission signals,
wherein the mixing frequency $f_c$ is selected as $$f_c = \frac{k_c}{T_U}$$

with the OFDM subcarrier $k_c$ at the mixing frequency $f_c$ being selected as $$k_c = \left\lfloor \frac{K_{max} + K_{min}}{2} \cdot \frac{\Delta}{T_U} + \frac{1}{2} \right\rfloor \cdot \frac{1}{\left(\frac{\Delta}{T_U}\right)},$$

where $T_U$ is the useful OFDM symbol duration, $\Delta$ is the duration of the guard interval, $K_{min}$ is the carrier index of first active carrier having the lowest frequency, and $K_{max}$ is the carrier index of last active carrier having the highest frequency.

8. The OFDM generation apparatus as claimed in claim 1 or 7, further comprising a storage hardware configured to store the mixing frequency $f_c$.

9. The OFDM generation apparatus as claimed in claim 1 or 7, wherein the circuitry is further configured to calculate the mixing frequency $f_c$.

10. The OFDM generation apparatus as claimed in claim 1 or 7, wherein the mixing frequency $f_c$ is selected dependent on the duration of a guard interval inserted between OFDM symbols and the useful OFDM symbol duration.

11. An Orthogonal Frequency-Division Multiplexing (OFDM) generation method for generating Absolute OFDM transmission signals from OFDM symbols, each comprising a plurality of OFDM subcarriers, for transmission in a multi-carrier data transmission system, said method comprising:
 multiplying, using circuitry, the OFDM symbols with a multiplication factor for compensating common phase rotations of the OFDM subcarriers of the OFDM symbols, which could be introduced by mixing complex time-domain samples of said OFDM symbols from a baseband frequency up to a passband frequency by use of a mixing frequency $f_c$;
 inverse discrete Fourier transforming, using the circuitry, the OFDM symbols into complex time-domain samples; and
 mixing, using the circuitry, said complex time-domain samples of said OFDM symbols from a baseband frequency up to a passband frequency by use of the mixing frequency $f_c$ to obtain said Absolute OFDM transmission signals,
 wherein the mixing frequency $f_c$ is selected such that common phase rotations of the OFDM subcarriers of said OFDM symbol with respect to adjacent OFDM symbols of said Absolute OFDM transmission signals are avoided or compensated after said mixing, and
 wherein the mixing frequency $f_c$ is selected as $$f_c = \frac{k_c}{T_U}$$

with the OFDM subcarrier $k_c$ at the mixing frequency $f_c$ being selected as $$k_{DS,c} = \left\lfloor \frac{K_{DS,max} + K_{DS,min}}{2} \cdot \frac{\Delta}{T_U} + \frac{1}{2} \right\rfloor \cdot \frac{1}{\left(\frac{\Delta}{T_U}\right)},$$

where $T_U$ is the useful OFDM symbol duration, $\Delta$ is the duration of the guard interval, $K_{min}$ is the carrier index of first active carrier having the lowest frequency, and $K_{max}$ is the carrier index of last active carrier having the highest frequency.

12. An Orthogonal Frequency-Division Multiplexing (OFDM) generation method for generating Absolute OFDM transmission signals from OFDM symbols, each comprising a plurality of OFDM subcarriers, for transmission in a multi-carrier data transmission system, said method comprising:
 determining, using circuitry, receiver mixing frequencies for use by an OFDM decoding apparatus of a receiving apparatus for mixing a received OFDM transmission signal from a passband frequency down to a baseband frequency by use of a receiver mixing frequency $f_{DS,c}$ to obtain complex time-domain samples of a data symbol in a receiver,
  wherein the receiver mixing frequencies are selected such that common phase rotations of the OFDM subcarriers of the data symbol with respect to adjacent data symbols of the same data segment are avoided or compensated after mixing the received OFDM transmission signal from the passband frequency down to the baseband frequency by use of the selected receiver mixing frequencies, and
  wherein the receiver mixing frequency $f_{DS,c}$ is selected as $$f_{DS,c} = \frac{k_{DS,c}}{T_U}$$

with the OFDM subcarrier $k_{DS,c}$ at the receiver mixing frequency $f_{DS,c}$ being selected as $$k_{DS,c} = \left\lfloor \frac{K_{DS,max} + K_{DS,min}}{2} \cdot \frac{\Delta}{T_U} + \frac{1}{2} \right\rfloor \cdot \frac{1}{\left(\frac{\Delta}{T_U}\right)},$$

where $T_U$ is the useful OFDM symbol duration, $\Delta$ is the duration of the guard interval, $K_{DS,min}$ is the carrier index of first active carrier of the data segment, onto which the data symbol mixed with said mixing frequency is mapped, having the lowest frequency, and $K_{DS,max}$ is the carrier index of last active carrier of the data segment, onto which the data symbol mixed with said mixing frequency is mapped, having the highest frequency;
 inverse discrete Fourier transforming, using the circuitry, the OFDM symbols into said complex time-domain samples; and
 mixing, using the circuitry, said complex time-domain samples of said OFDM symbols from a baseband frequency up to a passband frequency by use of a transmitter mixing frequency to obtain said Absolute OFDM transmission signals, wherein the OFDM symbols include data, signaling information, and said receiver mixing frequencies, and are mapped onto frames of a frame structure having a channel bandwidth, said frames having a payload portion being segmented in frequency domain into data segments each covering a bandwidth portion of said channel bandwidth, and wherein data symbols are mapped onto said data segments.

13. An Orthogonal Frequency-Division Multiplexing (OFDM) generation method for generating Absolute OFDM transmission signals from OFDM symbols, each comprising a plurality of OFDM subcarriers, for transmission in a multi-carrier data transmission system, said method comprising:
 multiplying, using circuitry, the OFDM symbols with a multiplication factor for compensating common phase rotations of the OFDM subcarriers of said OFDM symbols, which could be introduced by mixing complex time-domain samples of said OFDM symbols from a baseband frequency up to a passband frequency by use of a mixing frequency $f_c$;
 inverse discrete Fourier transforming, using the circuitry, the OFDM symbols into said complex time-domain samples; and
 mixing, using the circuitry, said complex time-domain samples of said OFDM symbols from the baseband frequency up to the passband frequency by use of said mixing frequency $f_c$ to obtain said Absolute OFDM transmission signals, wherein the mixing frequency $f_c$ is selected as $$f_c = \frac{k_c}{T_U}$$

with the OFDM subcarrier $k_c$ at the mixing frequency $f_c$ being selected as $$k_c = \left\lfloor \frac{K_{max} + K_{min}}{2} \cdot \frac{\Delta}{T_U} + \frac{1}{2} \right\rfloor \cdot \frac{1}{\left(\frac{\Delta}{T_U}\right)},$$

where $T_U$ is the useful OFDM symbol duration, $\Delta$ is the duration of the guard interval, $K_{min}$ is the carrier index of first active carrier having the lowest frequency, and $K_{max}$ is the carrier index of last active carrier having the highest frequency.

14. A transmission apparatus for transmitting data within a multi-carrier data transmission system, comprising:
an Orthogonal Frequency-Division Multiplexing (OFDM) generation apparatus according to claim 1, 4, or 7, configured to generate Absolute OFDM transmission signals from OFDM symbols, each comprising a plurality of OFDM subcarriers, for transmission in the multi-carrier data transmission system; and
circuitry configured to transmit said Absolute OFDM transmission signals.

15. A transmission method for transmitting data within a multi-carrier data transmission system, comprising:
an Orthogonal Frequency-Division Multiplexing (OFDM) generation method according to any one of claims 11 to 13, for generating Absolute OFDM transmission signals from OFDM symbols, each comprising a plurality of OFDM subcarriers, for transmission in the multi-carrier data transmission system; and
transmitting, using circuitry, said Absolute OFDM transmission signals.

16. An Orthogonal Frequency-Division Multiplexing (OFDM) decoding apparatus for decoding Absolute OFDM transmission signals into OFDM symbols, each comprising a plurality of OFDM subcarriers, received in a multi-carrier data transmission system, said apparatus comprising:
circuitry configured to:
perform frequency mixing of said Absolute OFDM transmission signals from a passband frequency down to a baseband frequency by use of a mixing frequency $f_c$ to obtain complex time-domain samples of the OFDM symbols; and
Discrete Fourier Transform (DFT) said complex time-domain samples into a data symbol,
wherein the mixing frequency $f_c$ is selected such that common phase rotations of the OFDM subcarriers of said OFDM symbols with respect to adjacent OFDM symbols of said Absolute OFDM transmission signals are avoided or compensated, and
wherein the mixing frequency $f_c$ is selected as $$f_c = \frac{k_c}{T_U}$$

with the OFDM subcarrier $k_c$ at the mixing frequency $f_c$ being selected as $$k_c = \left\lfloor \frac{K_{max} + K_{min}}{2} \cdot \frac{\Delta}{T_U} + \frac{1}{2} \right\rfloor \cdot \frac{1}{\left(\frac{\Delta}{T_U}\right)},$$

where $T_U$ is the useful OFDM symbol duration, $\Delta$ is the duration of the guard interval, $K_{min}$ is the carrier index of first active carrier having the lowest frequency, and $K_{max}$ is the carrier index of last active carrier having the highest frequency.

17. An Orthogonal Frequency-Division Multiplexing (OFDM) decoding apparatus for decoding Absolute OFDM transmission signals into OFDM symbols, each comprising a plurality of OFDM subcarriers, received in a multi-carrier data transmission system, said apparatus comprising:
circuitry configured to:
perform frequency mixing of said Absolute OFDM transmission signals from a passband frequency down to a baseband frequency by use of a receiver mixing frequency $f_{DS,c}$ signaled from a transmission apparatus, to obtain complex time-domain samples of a data symbol,
wherein the OFDM symbols are mapped onto frames of a frame structure having a channel bandwidth, said frames having a payload portion being segmented in frequency domain into data segments each covering a bandwidth portion of said channel bandwidth, and
wherein data symbols are mapped onto said data segments; and
Discrete Fourier Transform (DFT) said complex time-domain samples into the data symbol,
wherein the receiver mixing frequency $f_{DS,c}$ is selected such that common phase rotations of the OFDM subcarriers of the data symbol with respect to adjacent data symbols of the same data segment are avoided or compensated after mixing the received OFDM transmission signals from the passband frequency down to the baseband frequency by use of said receiver mixing frequency $f_{DS,c}$; and
wherein the receiver mixing frequency $f_{DS,c}$ is selected as $$f_{DS,c} = \frac{k_{DS,c}}{T_U}$$

with the OFDM subcarrier $k_{DS,c}$ at the receiver mixing frequency $f_{DS,c}$ being selected as $$k_{DS,c} = \left\lfloor \frac{K_{DS,max} + K_{DS,min}}{2} \cdot \frac{\Delta}{T_U} + \frac{1}{2} \right\rfloor \cdot \frac{1}{\left(\frac{\Delta}{T_U}\right)},$$

where $T_U$ is the useful OFDM symbol duration, $\Delta$ is the duration of the guard interval, $K_{DS,min}$ is the carrier index of first active carrier of the data segment, onto which the data symbol mixed with said mixing frequency is mapped, having the lowest frequency, and $K_{DS,max}$ is the carrier index of last active carrier of the data segment, onto which the data symbol mixed with said mixing frequency is mapped, having the highest frequency.

18. An Orthogonal Frequency-Division Multiplexing (OFDM) decoding method for decoding Absolute OFDM transmission signals into OFDM symbols, each comprising a plurality of OFDM subcarriers, received in a multi-carrier data transmission system, said method comprising:

mixing, using circuitry, said Absolute OFDM transmission signals from a passband frequency down to a baseband frequency by use of a mixing frequency $f_c$ to obtain complex time-domain samples of the OFDM symbols; and discrete Fourier transforming, using the circuitry, said complex time-domain samples into a data symbol, wherein the mixing frequency $f_c$ is selected such that common phase rotations of the OFDM subcarriers of said OFDM symbols with respect to adjacent OFDM symbols of said Absolute OFDM transmission signals are avoided or compensated, and wherein the mixing frequency $f_c$ is selected as $$f_c = \frac{k_c}{T_U}$$

with the OFDM subcarrier $k_c$ at the mixing frequency $f_c$ being selected as $$k_c = \left\lfloor \frac{K_{max} + K_{min}}{2} \cdot \frac{\Delta}{T_U} + \frac{1}{2} \right\rfloor \cdot \frac{1}{\left(\frac{\Delta}{T_U}\right)},$$

where $T_u$ is the useful OFDM symbol duration, $\Delta$ is the duration of the guard interval, $K_{min}$ is the carrier index of first active carrier having the lowest frequency, and $K_{max}$ is the carrier index of last active carrier having the highest frequency.

19. An Orthogonal Frequency-Division Multiplexing (OFDM) decoding method for decoding Absolute OFDM transmission signals into OFDM symbols, each comprising a plurality of OFDM subcarriers, received in a multi-carrier data transmission system, said method comprising:

mixing, using circuitry, said Absolute OFDM transmission signals from a passband frequency down to a baseband frequency by use of a receiver mixing frequency $f_{DS,c}$, signaled from a transmission apparatus, to obtain complex time-domain samples of a data symbol, wherein the OFDM symbols are mapped onto frames of a frame structure having a channel bandwidth, said frames having a payload portion being segmented in frequency domain into data segments each covering a bandwidth portion of said channel bandwidth, and wherein data symbols are mapped onto said data segments; and discrete Fourier transforming said complex time-domain samples into the data symbol, wherein the receiver mixing frequency $f_{DS,c}$ is selected such that common phase rotations of the OFDM subcarriers of the data symbol with respect to adjacent data symbols of the same data segment are avoided or compensated after mixing the received OFDM transmission signal from the passband frequency down to the baseband frequency by use of said receiver mixing frequency $f_{DS,c}$, and wherein the receiver mixing frequency $f_{DS,c}$ is selected as $$f_{DS,c} = \frac{k_{DS,c}}{T_U}$$

with the OFDM subcarrier $k_{DS,c}$ at the receiver mixing frequency $f_{DS,c}$ being selected as $$k_{DS,c} = \left\lfloor \frac{K_{DS,max} + K_{DS,min}}{2} \cdot \frac{\Delta}{T_U} + \frac{1}{2} \right\rfloor \cdot \frac{1}{\left(\frac{\Delta}{T_U}\right)},$$

where $T_U$ is the useful OFDM symbol duration, $\Delta$ is the duration of the guard interval, $K_{DS\,min}$ is the carrier index of first active carrier of the data segment, onto which the data symbol mixed with said mixing frequency is mapped, having the lowest frequency, and $K_{DS,\,max}$ is the carrier index of last active carrier of the data segment, onto which the data symbol mixed with said mixing frequency is mapped, having the highest frequency.

20. A receiving apparatus for receiving data within a multi-carrier data transmission system, comprising:

circuitry configured to receive Absolute Orthogonal Frequency-Division Multiplexing (OFDM) transmission signals; and an OFDM decoding apparatus according to claim 16 or 17 configured to decode the Absolute OFDM transmission signals into OFDM symbols, each comprising a plurality of OFDM subcarriers, received in said multi-carrier data transmission system.

21. A receiving method for receiving data within a multi-carrier data transmission system, comprising:

receiving, using circuitry, Absolute Orthogonal Frequency-Division Multiplexing (OFDM) transmission signals; and an OFDM decoding method according to claim 18 or 19 for decoding the Absolute OFDM transmission signals into OFDM symbols, each comprising a plurality of OFDM subcarriers, received in said multi-carrier data transmission system.

22. A multi-carrier data transmission system, comprising:
a transmission apparatus configured to transmit data, comprising:
an Orthogonal Frequency-Division Multiplexing (OFDM) generation apparatus configured to generate Absolute OFDM transmission signals from OFDM symbols, each comprising a plurality of OFDM subcarriers, for transmission in the multi-carrier data transmission system, the OFDM generation apparatus comprising:
first circuitry configured to:
multiply the OFDM symbols with a multiplication factor for compensating common phase rotations of the OFDM subcarriers of said OFDM symbols, which could be introduced by mixing complex time-domain samples of said OFDM symbols from a baseband frequency up to a passband frequency by use of a mixing frequency $f_c$;
inverse Discrete Fourier Transform (DFT) the OFDM symbols into said complex time-domain samples;
perform frequency mixing of said complex time-domain samples of said OFDM symbols from the baseband frequency up to the passband frequency by use of said mixing frequency to obtain said Absolute OFDM transmission signals, wherein the mixing frequency $f_c$ is selected such that common phase rotations of the OFDM subcarriers of the at least one OFDM symbol with respect to adjacent OFDM symbols of said Absolute OFDM transmission signals are avoided or compensated after said mixing, and wherein the mixing frequency $f_c$ is selected as $$f_c = \frac{k_c}{T_U}$$

with the OFDM subcarrier $k_c$ at the mixing frequency $f_c$ being selected as $$k_c = \left\lfloor \frac{K_{max} + K_{min}}{2} \cdot \frac{\Delta}{T_U} + \frac{1}{2} \right\rfloor \cdot \frac{1}{\left(\frac{\Delta}{T_U}\right)},$$

where $T_U$ is the useful OFDM symbol duration, $\Delta$ is the duration of the guard interval, $K_{min}$ is the carrier index of first active carrier having the lowest frequency, and $K_{max}$ is the carrier index of last active carrier having the highest frequency; and transmit said Absolute OFDM transmission signals;

a receiving apparatus configured to receive data from said transmission apparatus, including said transmitted Absolute OFDM transmission signals, said receiving apparatus comprising:

an OFDM decoding apparatus configured to decode the transmitted Absolute OFDM transmission signals into the OFDM symbols, each comprising the plurality of OFDM subcarriers, received in said multi-carrier data transmission system, said OFDM decoding apparatus comprising:

second circuitry configured to:

perform frequency mixing of said transmitted Absolute OFDM transmission signals from the passband frequency down to the baseband frequency by use of a receiver mixing frequency $f_{DS,c}$ signaled from a transmission apparatus, to obtain said complex time-domain samples of the data symbol, wherein the OFDM symbols are mapped onto frames of a frame structure having a channel bandwidth, said frames having a payload portion being segmented in frequency domain into data segments each covering a bandwidth portion of said channel bandwidth, and wherein data symbols are mapped onto said data segments; and Discrete Fourier Transform (DFT) said complex time-domain samples into the data symbol, wherein the receiver mixing frequency $f_{DS,c}$ is selected such that common phase rotations of the OFDM subcarriers of the data symbol with respect to adjacent data symbols of the same data segment are avoided or compensated after mixing the received OFDM transmission signal from the passband frequency down to the baseband frequency by use of said receiver mixing frequency $f_{DS,c}$, and wherein the receiver mixing frequency $f_{DS,c}$ is selected as $$f_{DS,c} = \frac{k_{DS,c}}{T_U}$$

with the OFDM subcarrier $k_{DS,c}$ at the receiver mixing frequency $f_{DS,c}$ being selected as $$k_{DS,c} = \left\lfloor \frac{K_{DS,max} + K_{DS,min}}{2} \cdot \frac{\Delta}{T_U} + \frac{1}{2} \right\rfloor \cdot \frac{1}{\left(\frac{\Delta}{T_U}\right)},$$

where $T_U$ is the useful OFDM symbol duration, $\Delta$ is the duration of the guard interval, $K_{DS,min}$ is the carrier index of first active carrier of the data segment, onto which the data symbol mixed with said mixing frequency is mapped, having the lowest frequency, and $K_{DS,\,max}$ is the carrier index of last active carrier of the data segment, onto which the data symbol mixed with said mixing frequency is mapped, having the highest frequency.

23. A computer readable non-transitory storage medium having instructions stored thereon which, when carried out on a computer, cause the computer to perform the steps of the method as claimed in claim 11, 12, 13, 18, or 19.

* * * * *